United States Patent
Jones et al.

[11] Patent Number: 6,086,514
[45] Date of Patent: Jul. 11, 2000

[54] CLUTCH CONTROL METHOD FOR DETERMINING CLUTCH KISS-POINT DURING RUNNING CONDITIONS

[75] Inventors: Charles John Jones, Earlsdon; Paul Grahame Martin, Daventry, both of United Kingdom

[73] Assignee: Luk Leamington Limited, Warwickshire, United Kingdom

[21] Appl. No.: 09/117,855

[22] PCT Filed: Dec. 19, 1997

[86] PCT No.: PCT/GB97/03497

§ 371 Date: Aug. 12, 1998

§ 102(e) Date: Aug. 12, 1998

[87] PCT Pub. No.: WO98/28162

PCT Pub. Date: Jul. 2, 1998

[30] Foreign Application Priority Data

Dec. 20, 1996 [GB] United Kingdom ................. 9626527

[51] Int. Cl.⁷ ........................................... B60K 41/02
[52] U.S. Cl. ....................... 477/180; 477/74; 477/86
[58] Field of Search ......................... 477/84, 86, 174, 477/175, 180

[56] References Cited

U.S. PATENT DOCUMENTS

| | | | |
|---|---|---|---|
| 4,646,891 | 3/1987 | Braun | 477/180 X |
| 4,899,858 | 2/1990 | Cote et al. | 477/180 X |
| 5,184,301 | 2/1993 | Stasell | 477/180 X |
| 5,332,074 | 7/1994 | Braun | 477/87 X |
| 5,337,868 | 8/1994 | Liu et al. | 477/74 X |
| 5,337,874 | 8/1994 | Oltean et al. | 192/111 A |
| 5,378,211 | 1/1995 | Slicker et al. | 477/180 X |
| 5,383,823 | 1/1995 | Ward et al. | 477/86 |
| 5,411,124 | 5/1995 | Olson | 477/180 X |
| 5,439,428 | 8/1995 | Slicker | 477/175 |
| 5,634,867 | 6/1997 | Mack | 477/180 X |
| 5,681,242 | 10/1997 | Bates | 477/180 |
| 5,871,419 | 2/1999 | Amendt | 477/180 |

FOREIGN PATENT DOCUMENTS

| | | |
|---|---|---|
| 0 038 113 | of 0000 | European Pat. Off. . |
| 0 043 660 | of 0000 | European Pat. Off. . |
| 0 059 035 | of 0000 | European Pat. Off. . |
| 0 101 220 | of 0000 | European Pat. Off. . |
| 0 566 595 | of 0000 | European Pat. Off. . |
| 0 207 525 A2 | 1/1987 | European Pat. Off. . |
| 0 244 131 A2 | 11/1987 | European Pat. Off. . |
| 0 320 261 A1 | 6/1989 | European Pat. Off. . |
| 0 385 629 A2 | 9/1990 | European Pat. Off. . |
| 2 682 649 | 4/1993 | France . |
| 2 292 591 | of 0000 | United Kingdom . |

*Primary Examiner*—Khoi Q. Ta
*Attorney, Agent, or Firm*—Darby & Darby

[57] ABSTRACT

A method of determining, during a clutch re-engagement process, the kiss-point of a vehicle clutch (14) having a driven plate (40) which drives a vehicle from an engine (10) via a multi-ratio transmission (12). The clutch is operated via a clutch actuating mechanism (20, 22) under the control of an electronic control means (36) using a method comprising the steps of: checking that the throttle (18) of the engine is closed and that the vehicle is in an engine overrun condition; partially reengaging the clutch (14) up to a point (Y) where the clutch increases the engine speed to a substantially constant level below the speed of the driven plate (40) of the clutch; measuring (34) the position of the clutch actuating mechanism (20, 22) when in said partially engaged condition; computing from said position measurement(s) and the known engagement/torque characteristics (T1, T2, T3) of the clutch the current kiss-point position (T); saving said current kiss-point position (T), and completing the engagement of the clutch.

11 Claims, 5 Drawing Sheets

6,086,514

CLUTCH CONTROL METHOD FOR DETERMINING CLUTCH KISS-POINT DURING RUNNING CONDITIONS

BACKGROUND OF THE INVENTION

This invention relates to clutch calibration and in particular to the determination of the so-called "Kiss-point" of a clutch when the clutch just begins to make frictional contact during its engagement.

It is known to provide clutch control systems in which the clutch is engaged and disengaged by an hydraulic actuator (or some other actuator such as an electric motor) under the control of an electronic control means which, for example, engages the clutch for vehicle start-up when the accelerator is depressed, disengages the clutch when the vehicle comes to a halt, and which disengages the clutch during ratio changes in an associated transmission when a gear selector lever is moved by the operator. Examples of such clutch control systems are disclosed in, for example, European patents 0038113, 0043660, 0059035, 0101220 and 0566595.

In order to ensure the continued accurate operation of such clutch control systems it is necessary for the electronic control means to know accurately the position of the clutch kiss-point. This therefore presents a problem since the kiss-point changes as the clutch and the associated actuating mechanism wears.

SUMMARY OF THE INVENTION

It is an object of the present invention to provide a method of determining the kiss-point of a clutch which can be regularly implemented during use of the associated vehicle with the minimal effect on the operation of the vehicle so that the determination is not perceived by the operator or passengers.

Thus according to the present invention there is provided a method of determining, during a clutch re-engagement process, the kiss-point of a vehicle clutch having a driven plate which drives a vehicle from an engine via a multi-ratio transmission, operation of the clutch being via a clutch actuating mechanism under the control of an electronic control means, said method comprising the steps of:

checking that the throttle of the engine is closed and that the vehicle is in an engine overrun condition;

partially re-engaging the clutch up to a point where the clutch increases the engine speed to a substantially constant level below the speed of the driven plate of the clutch;

measuring the position of the clutch actuating mechanism when in said partially engaged condition;

computing from said position measurement and the known engagement/torque characteristics of the clutch the current kiss-point position;

saving said current kiss-point position, and completing the engagement of the clutch.

The present invention also provides a method of determining the kiss-point of a vehicle clutch which drives a vehicle from an engine via a multi-ratio transmission, operation of the clutch being via a clutch actuating mechanism under the control of an electronic control means, said method comprising the steps of:

determining when a downshift in the operative ratio of the associated transmission has been selected;

checking that the throttle of the engine is closed;

disengaging the clutch;

disengaging the old transmission ratio and engaging the required new ratio;

partially re-engaging the clutch up to a point where the clutch increases the engine speed to a substantially constant level below the speed of the driven plate of the clutch;

measuring the position of the clutch actuating mechanism when in said partially engaged condition;

computing from said position measurement and the known engagement/torque characteristics of the clutch the current kiss-point position;

saving said current kiss-point position, and completing the engagement of the clutch.

In a preferred arrangement the electronic control means senses the engine speed and the speed of the driven plate of the clutch prior to re-engagement and then re-engages the clutch to drive the engine at a speed in a predetermined relationship to said sensed speeds.

The vehicle engine may conveniently be driven by the clutch at a speed halfway between the sensed engine and driven plate speeds.

During a given kiss-point determination a series of clutch actuating mechanism position measurements may be made and this series of measurements may be compared for consistency and if sufficiently consistent, indicating a steady state clutch engagement condition, are utilised for a kiss-point determination.

The electronic control means may set a time limit for making the position measurements of the clutch actuating mechanism to prevent prolonged clutch slippage.

BRIEF DESCRIPTION OF THE DRAWING(S)

One embodiment of the present invention will now be described, by way of example only, with reference to the accompanying drawings in which.

DESCRIPTION OF THE PREFERRED EMBODIMENT(S)

Figure 1:
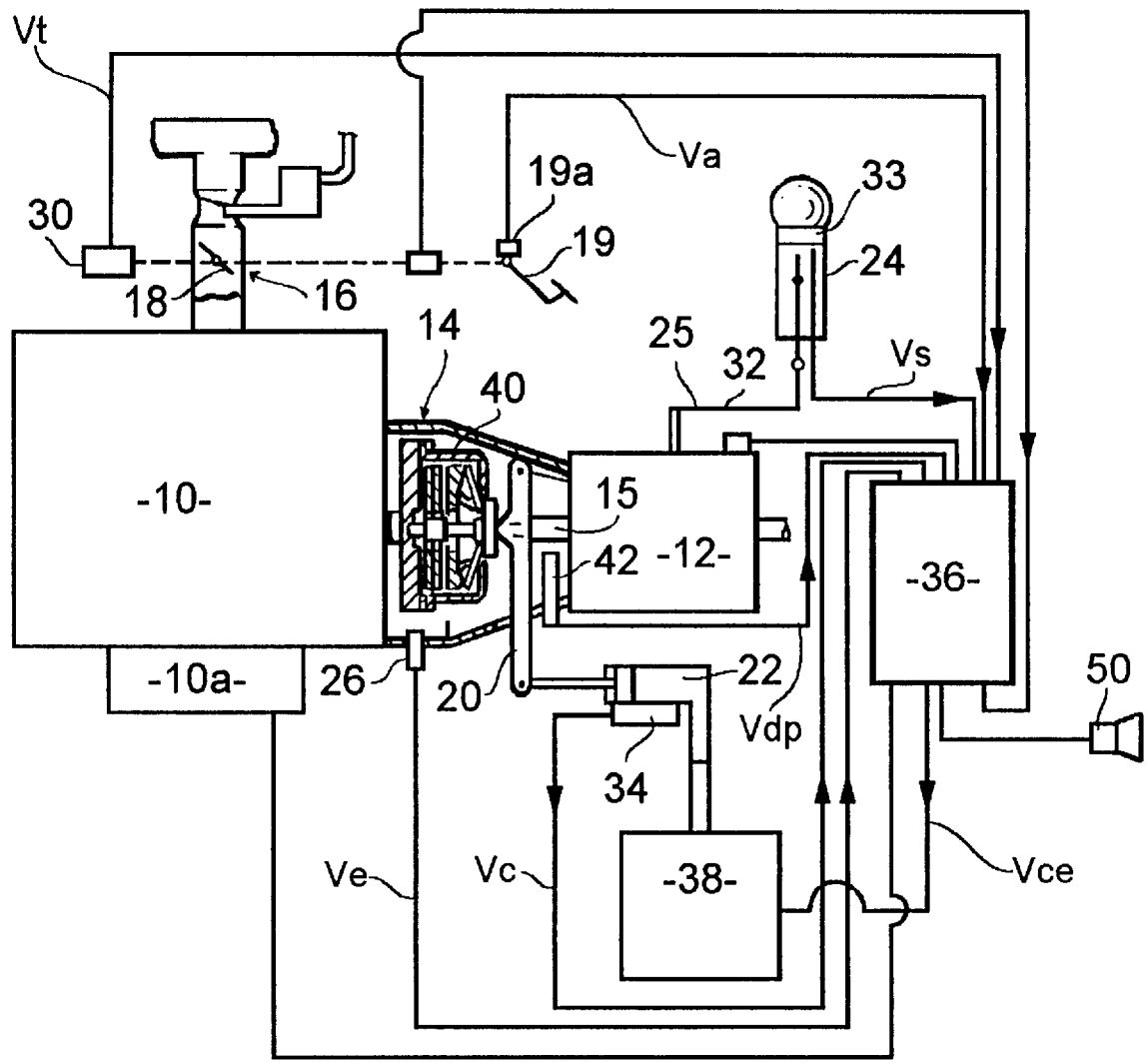
FIG. 1 shows in diagrammatic form the general layout of a clutch control system embodying the present invention.

Referring to FIG. 1 this shows an engine 10 with a starter and an associated starter circuit 10a which is coupled through a friction clutch 14 with a multi-ratio transmission 12 via a transmission input shaft 15. In the example described, fuel is supplied to the engine by a throttle 16 which includes a throttle valve 18 operated by an accelerator pedal 19. The invention is equally applicable to electronic or mechanical fuel injected petrol or diesel engines.

The clutch 14 is actuated by a release fork 20 which is operated by a slave cylinder 22. The transmission is controlled by a ratio selector member in the form of a lever 24 which is connected with the transmission via a selector linkage 25 and which includes a load-sensing switch means 33 which detects forces applied to the lever 24 by the driver and produces a signal Vs indicating an intention to change the operative ratio of the transmission.

An electronic control unit 36 controls the actuation of the clutch 14 via an hydraulic control 38 which controls the operation of slave cylinder 22. Control unit 36 receives signals Vs from selector lever 24 and signals Ve proportional to engine speed from engine speed sensor 26. Signals Vt from throttle valve position sensor 30 proportional to the current throttle opening and accelerator pedal position signals Va from an accelerator position sensor 19a are also fed to control unit 36. Control unit 36 also receives a ratio signal Vg from ratio position sensor 32 which corresponds to the transmission ratio currently engaged, signals Vc from slave cylinder position sensor 34, which varying with the position of the slave cylinder, and signals Vdp proportional to clutch driven plate speed from speed sensor 42 which actually senses the speed of the transmission input shaft 15 (which is equal to that of a driven plate 40 of the clutch 14). Since the speed of the vehicle depends on the driven plate speed and the ratio engaged, the driven plate speed sensor 42 acts in effect as a vehicle speed sensor and vice versa. Thus in some applications no drive plate speed sensor 42 is provided and this speed is calculated from the transmission ratio and the vehicle speed which is given by a separate sensor, A throttle control 37 is operated by the control unit 36 so that the throttle can be opened and closed independently of the accelerator pedal 19. A buzzer 50 is connected with control unit 36 to warn/indicate to the vehicle operator when certain vehicle operating conditions occur. In addition to or in place of buzzer 50 a flashing warning light (not shown) may be used.

Figure 2:
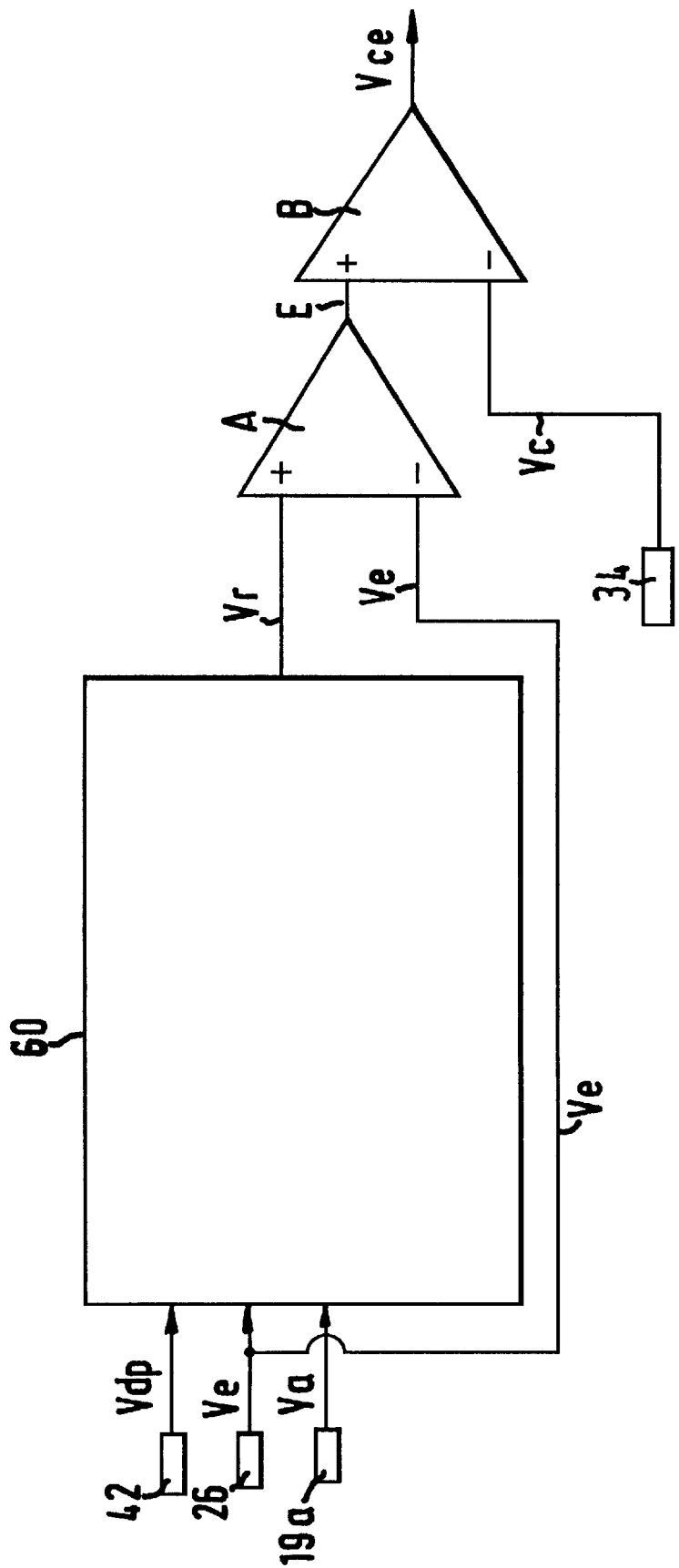
FIG. 2 shows in block diagram form the generation of the clutch take-up reference signal in the electronic control unit of the present invention.

Control unit 36 includes a reference signal generator 60 (see FIG. 2) which generates a reference signal Vr representative of a desired engine speed. This reference signal is compared in comparator A with the actual engine speed signal Ve from sensor 26 to produce an error signal E which is compared in comparator B with the clutch actuator position signal Vc from sensor 34 to provide a clutch engagement control signal Vce which control unit 36 outputs to hydraulic control 38. Operation of a control unit in this manner is described in more detail, for example, in the earlier European Patents 0038113 and 0043660 to which the reader should refer if further details are required. Co-pending UK Patent Application GB-A-2292591 includes a detailed description of the main reference signal generator 60 which detailed description is hereby incorporated in the present description.

In addition to controlling the engagement and disengagement of clutch 14 the control unit 36 also controls the throttle setting via control 37 when its control logic indicates that an override of the throttle opening set by the driver's operation of the accelerator 19 is desirable. In some applications the throttle control 37 may be omitted.

Figure 3:
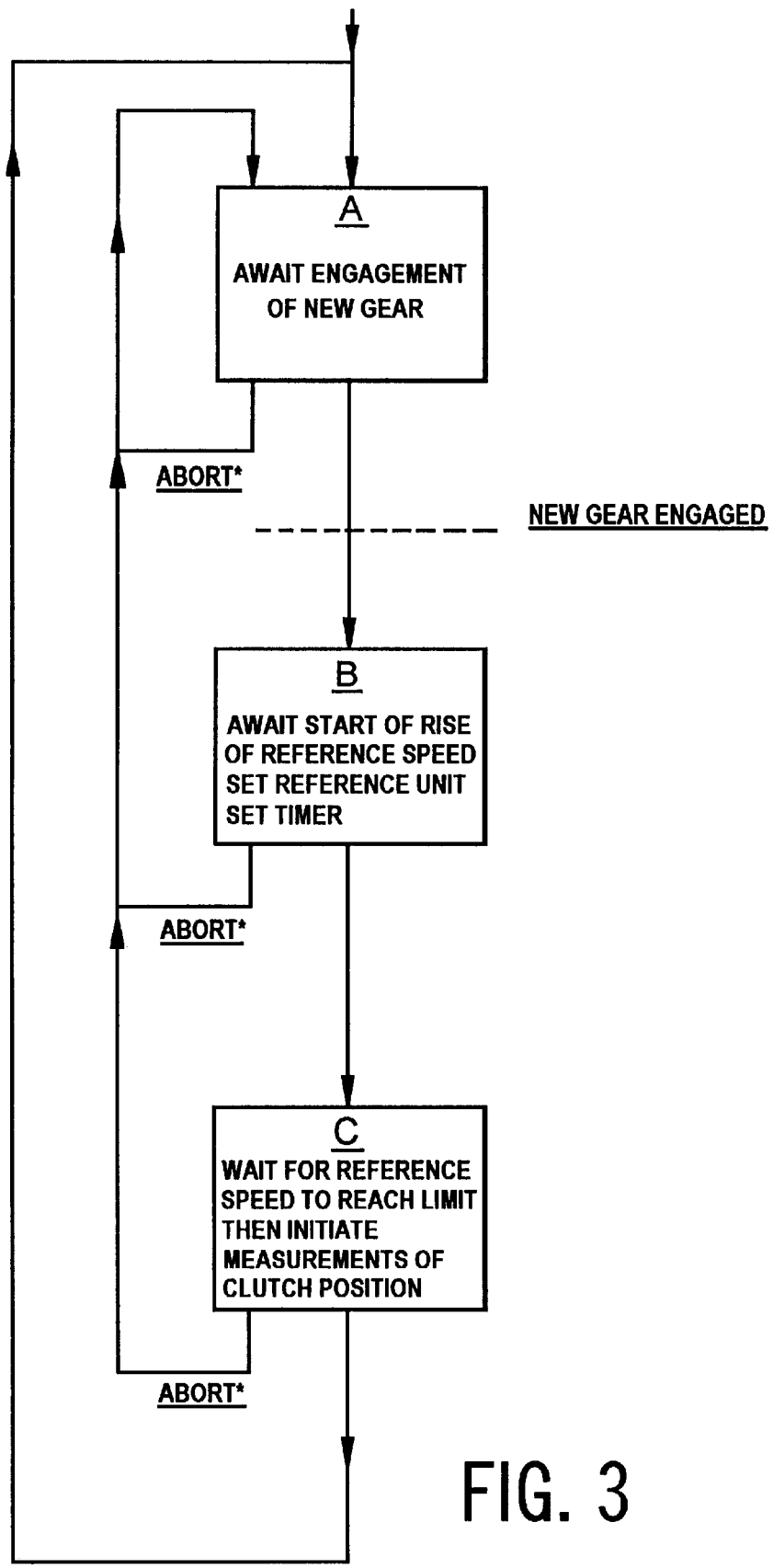
FIG. 3 shows the logic diagram for the kiss-point determination method of the present invention.

In accordance with the present invention the electronic control unit 36 includes a routine for determining the kiss-point of clutch 14 which is diagramatically illustrated in FIG. 3.

Figure 5:
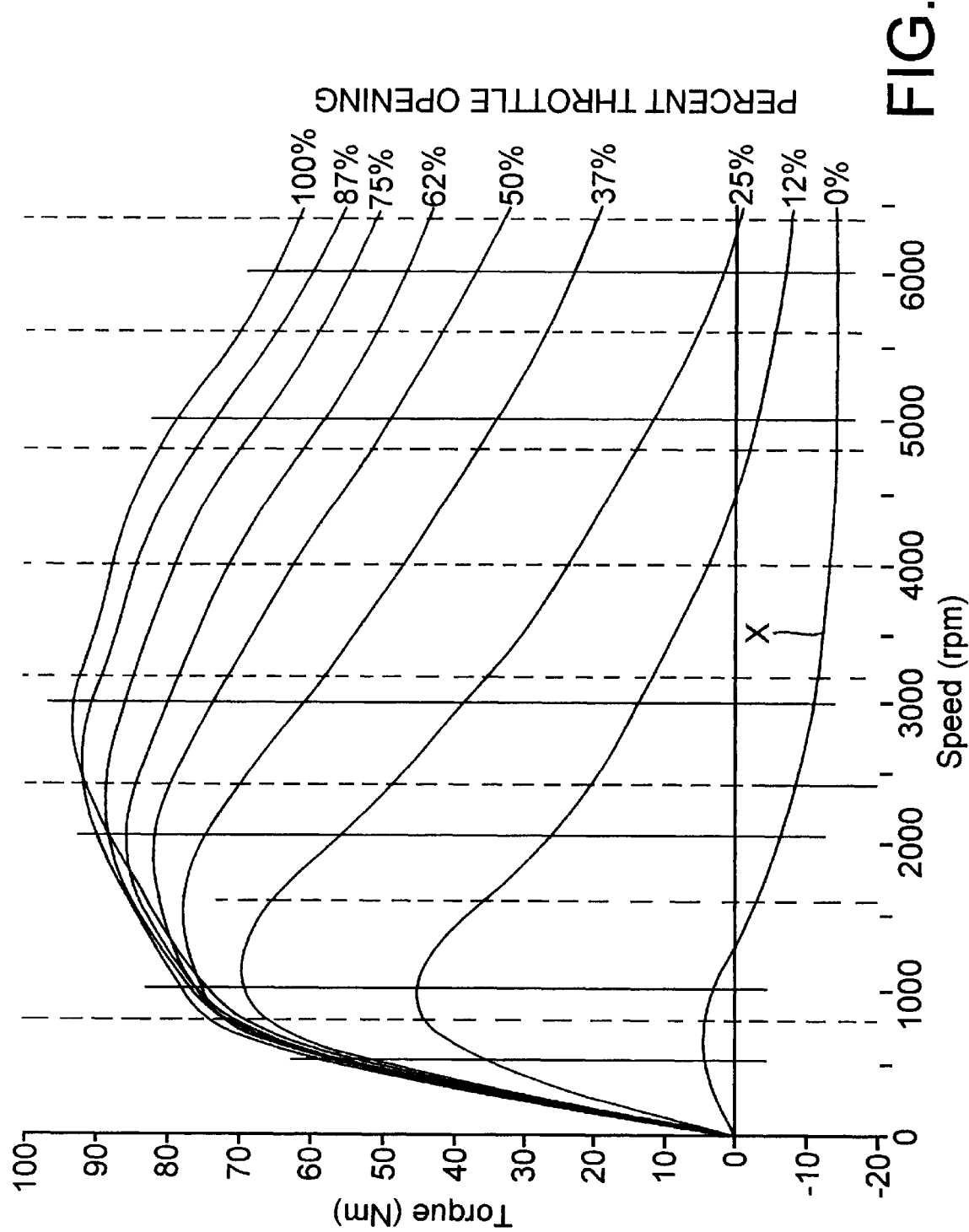
FIG. 5 shows a typical engine torque map illustrating the substantially constant negative torque required to turn-over the engine on overrun.

The method is based on the realisation that, with the engine in the throttle closed overrun condition, the torque required to turn over a petrol engine remains relatively constant over a relatively wide range of engine speeds. This is illustrated in FIG. 5 which shows a typical engine torque map where, for example, line X indicates that the negative torque remains substantially constant over a relatively wide speed range of say 2000 rpm to 6000 rpm. This negative torque is around 20% of the maximum torque developed by the engine. [It is believed that similar characteristics also apply to diesel engines]. Thus if the clutch is engaged to a level of slippage sufficient for the vehicle to increase the speed of the engine to a substantially constant level the negative torque transmitted by the clutch also remains relatively constant at the above referred to engine turn-over level. If a measurement of the position of the clutch actuating mechanism is made when this negative torque is being transmitted it is then possible knowing the clutch engagement/torque characteristic to compute the kiss-point of the clutch from this measured position.

Figure 4:
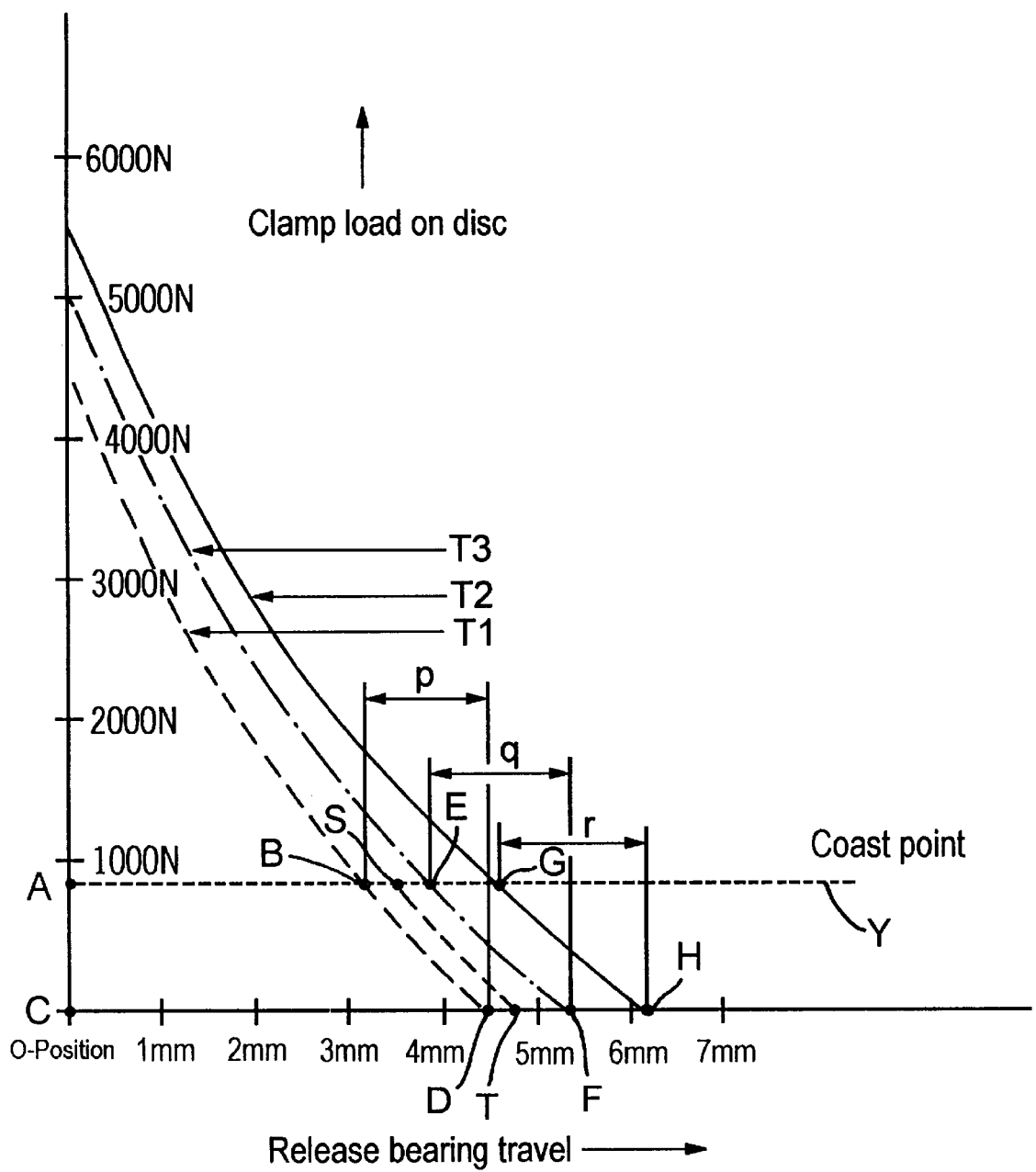
FIG. 4 shows a typical clutch engagement torque characteristic and illustrates its use in the computation of clutch kiss-point.

The above is illustrated in FIG. 4 which shows typical clutch engagement/torque characteristics where, clutch slip torque is plotted against clutch release bearing position. Curves T1, T2 and T3 show the characteristics of the same clutch at different times in its operating life and are therefore of the same curve form. Curve T1 shows the characteristic of a new unworn clutch, T2 shows the characteristic of a half worn clutch and T3 shows the characteristic of a fully worn clutch.

Line Y in FIG. 4, the so-called coast line, represents the steady state negative turn-over torque which is transmitted by the clutch during a kiss-point determination and is the line along which the clutch position measurements are taken during each kiss-point determination giving clutch release bearing position values (so-called coast points) B, E and G on curves T1, T3 and T2 respectively. Points D, F and H define the clutch release bearing positions at which the kiss-point occurs on curves T1, T3 and T2 respectively. The ratio AB/CD=AE/CF=AG/CH in FIG. 3 so that knowing the positions B, E and G and the shape of the Curves T1, T3 and T2 respectively the corresponding kiss-points D, F and H can be computed.

It will be noted in the clutch characteristic shown that the difference AB−CD (marked p), AE−CF (marked q), and AG−CH (marked r) increases up to an approximately half worn clutch condition and then decreases. Such wear characteristics need to be taken into account to give a more accurate kiss-point determination.

If during a given kiss-point determination the clutch position measurement gives a value of say S in FIG. 4 the corresponding kiss-point T is derived from the ratio AB/CD=AS/CT.

The kiss-point determination method described below is implemented on 4th to 3rd downshifts in a five speed box as this is a shift where the torque reversed is less evident to the operator and passengers than shifts between lower gears and shifts from 4th to 3rd are more numerous than 5th to 4th shifts.

Referring to FIG. 3, the routine for kiss-point calibration is carried out during down changes from 4th to 3rd. The electronic control unit 36 checks that the throttle remains closed during the calibration routine and that the engine has been running for sufficient time since start-up for it and the clutch to have reached its normal operating temperature. The electronic control unit also estimates on a continual basis [using, for example, the mathematical model that the energy input into the pressure plate is equal to the integral of the product of clutch slip speed and clutch slip torque and also using standard conduction and convection heat transfer theory] the surface temperature of the clutch plate and only performs the calibration when the clutch surface temperature is within specified limits. If any of these conditions is exceeded, or if clutch slip speed does not remain above a lower limit, the calibration is aborted.

At the start of the 4th to 3rd shift the clutch is disengaged by the control unit 36 and the old gear is disengaged. The new gear is then engaged (see Block A) and engine speed and driven plate speeds are measured and a reference speed is set typically halfway between these measured speeds.

Engagement of the clutch is then commenced by cylinder 22 until engagement just begins (see Block B) from where engagement continues under the control of unit 36 to raise the engine speed, for example, exponentially to the reference speed and then to hold the engine speed constant at the reference speed.

Once the engine has attained the selected reference speed (see Block C) a series of measurements of the engagement position of the clutch are made within a time limit and provided that this series of measurements is sufficiently consistent [indicating that the engine speed is also substantially constant and that the engine is receiving the substantially constant negative turn-over torque via the clutch] these measurements are used for subsequent computation of the clutch kiss-point position from the known clutch engagement/torque characteristic as outlined above. Typically the system looks to receive three consecutive substantially equal measurements before saving the position measurement for subsequent kiss-point computation.

On expiry of the measurement time limit, or on completion of the requisite number of consistent clutch engagement position measurements, clutch engagement is completed by raising the reference speed so that the engine speed is raised to the driven plate speed exponentially.

Time limits are imposed on the periods during which the clutch is slipping to prevent prolonged clutch slippage.

During a given journey the amount by which (or rate at which) the kiss-point can change at each determination or the rate at which the kiss-point can be changed is preferably limited to eliminate transient effects. This can be achieved by filtering the individual kiss-point measurements and may be applied as a rate limit to the change.

Although the kiss-point determination method of the present invention has been described above as being performed during a downshift in the associated transmission it could be implemented in any circumstance in which the engine is operating in an overrun condition.

Also, immediately prior to the electronic control means being de-activated at the end of a vehicle journey the electronic control stores a value of kiss-point position for use at the start of the next vehicle journey. This stored figure is related to the final actual kiss-point position computed prior to de-activation of the electronic control means and typically is the average of all the kiss-point positions computed during that journey.

Although the invention has been described above in relation to a transmission in which the operative ratio is selected manually using lever 24 it is equally applicable to a transmission in which the operative ratio is selected automatically by control unit 36 or to a transmission which can operate both manually or automatically at the choice of the vehicle operator.

Also, although the above described ratio technique [i.e. AC/CD=AE/CF=AG/CH] is used for the computation of the kiss-point from the measured steady state negative turn-over torque condition other relationships could be used for different clutch engagement/torque characteristics.

For example, a 3-dimensional map of clamp load in relation to the release travel and wear could be stored as a sequence of data points. Measurement of the coast point as the wear progresses would enable the clamp load curve for a particular state of wear to be derived from the map and the corresponding kiss-point to be determined by interpolation.

What is claimed is:

1. A method of determining, during a clutch re-engagement process, the kiss-point of a vehicle clutch having a driven plate which drives a vehicle from an engine via a multi-ratio transmission, operation of the clutch being via a clutch actuating mechanism under the control of an electronic control means, said method comprising the steps of:

checking that the throttle of the engine is closed and that the vehicle is in an engine overrun condition;

partially re-engaging the clutch up to a point where the clutch increases the engine speed to a substantially constant level below the speed of the driven plate of the clutch;

measuring the position of the clutch actuating mechanism when in said partially engaged condition;

computing from said position measurement and the known engagement/torque characteristics of the clutch the current kiss-point position;

saving said current kiss-point position, and completing the engagement of the clutch.

2. A method according to claim 1 in which the electronic control means senses the engine speed and the speed of the driven plate of the clutch prior to re-engagement and then re-engages the clutch to drive the engine at a speed in a predetermined relationship to said sensed speeds.

3. A method according to claims 1 in which the engine is driven at a speed halfway between the sensed engine and driven plate speeds.

4. A method according to claim 1 in which during a given kiss-point determination a series of clutch actuating mechanism position measurements are made and said series of measurements are compared for consistency and if sufficiently consistent, indicating a steady state clutch engagement condition, are utilised for a kiss-point determination.

5. A method according to claim 4 in which a time limit is set by the electronic control means for making the position measurements of the clutch actuating mechanism to prevent prolonged clutch slippage.

6. A method according to claim 1 in which a given kiss-point determination is aborted if the throttle does not remain closed or if the driven plate speed does not remain above a lower limit or if the temperature of the clutch, exceeds a predetermined level.

7. A method according to claim 1 which includes the preliminary step of checking that the engine has been operating for a sufficient time to ensure that normal clutch operating temperature has been reached.

8. A method according to claims 7 in which immediately prior to each deactivation of the electronic control means at the end of each vehicle journey the control means stores a value of kiss-point position related to the final actual kiss-point position computed during that specific journey.

9. A method according to claim 8 in which stored value of kiss-point position at the end of each vehicle journey is equal to the average of all the kiss-point positions computed during that specific journey.

10. A clutch control system which includes an electronic control means a routine for determining the kiss-point of the associated clutch in accordance with the method of claim 1.

11. A method of determining the kiss-point of a vehicle clutch having a driven plate which drives a vehicle from an engine via a multi-ratio transmission, operation of the clutch being via a clutch actuating mechanism under the control of an electronic control means, said method comprising the steps of:

determining when a downshift in the operative ratio of the associated transmission has been selected;

checking that the throttle is closed;

disengaging the clutch;

disengaging the old transmission ratio and engaging the required new ratio;

Partially re-engaging the clutch up to a point where the clutch increases the engine speed to a substantially constant level below the speed of the driven plate of the clutch;

measuring the position of the clutch actuating mechanism when in said partially engaged condition;

computing from said position measurement and the known engagement/torque characteristics of the clutch the current kiss-point position;

saving said current kiss-point position, and completing the engagement of the clutch.

* * * * *